…

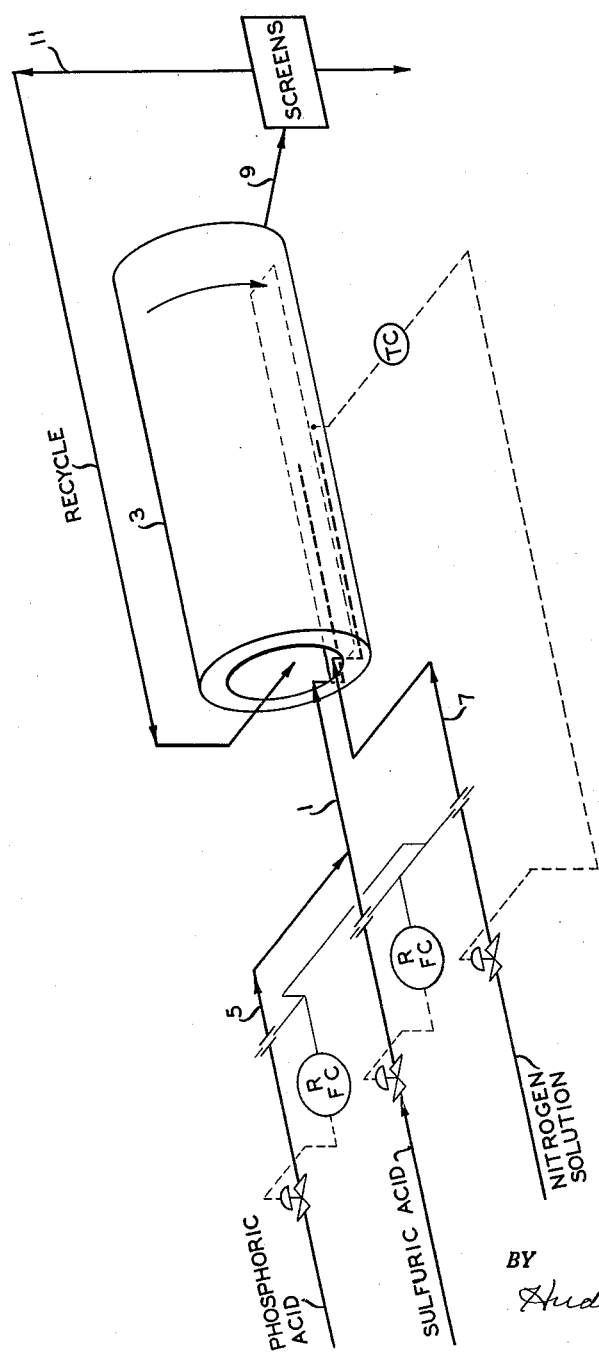

United States Patent Office 2,980,526
Patented Apr. 18, 1961

2,980,526

PREPARATION OF MIXED FERTILIZERS

Joseph F. Wilson, Bartlesville, Okla., assignor to Phillips Petroleum Company, a corporation of Delaware Filed Feb. 13, 1959, Ser. No. 793,166

5 Claims. (Cl. 71—32)

This invention relates to granular fertilizers. In one of its aspects, the invention provides a process for the continuous production of a dry, granular fertilizer having a high nitrogen content using a liquid nitrogen-containing solution and liquid sulfuric and phosphoric acids in the absence of any solid reactant. In another of its aspects, the invention includes maintaining in the reaction zone, in the presence of the liquids described, a solid sub-divided fertilizer product, having substantially the composition of the final product, in predetermined ratio range to the reactants. In a further aspect of the invention, provision is made to adjust the ratio of the solid, sub-divided fertilizer in said zone to the reactants fed to said zone to a value of at least about 2:1 while operating said zone at a temperature in the range of about 195 to about 230° F. and when said ratio is less than about 3:1, adjusting the ratio of the solid, granular recycled product to total weight of the acids to above about 4.5. In a further aspect, the invention relates to a process as herein described in which with the reaction mass in the reaction zone, there is maintained a body of solid, sub-divided fertilizer obtained by earlier reaction of said solution and acids, sufficient to ensure discharge from said zone of only solid, dry product having a desired size distribution.

The use of fertilizers has increased steadily over the last several years and today there are many different types of fertilizers available on the market. In addition to such single fertilizers as ammonium nitrate, ammonium sulfate, and the like, various fertilizers are formulated which contain nitrogen, phosphorus and potash. Fertilizers containing all three of these substituents are known in the trade as "complete goods." Many different formulations of mixed fertilizers are sold, their exact formulation depending upon the area where they are to be applied, the time of application and the crop which is to be fertilized. These mixed fertilizers are usually expressed in weight percent nitrogen, weight percent phosphorus as $P_2O_5$, and weight percent potassium as $K_2O$, for example, "5–10–5."

These mixed fertilizers are normally manufactured by one of the following methods: (1) by mechanically mixing separately prepared materials each of which contains a single fertilizer ingredient, (2) by blending materials containing one, two and three fertilizer ingredients or (3) by manufacturing a blended product in which particle is substantially of the same composition. Method (3) is widely used in the industry today, but is normally carried out by ammoniating one or more solid materials in a rotating mill such as a pug or a TVA ammoniator. It is now discovered that dry, granular mixed fertilizers containing, say, 26 to 27 weight percent nitrogen, 14 weight percent $P_2O_5$ and no potash can be manufactured by contacting selected liquids as the only reactants in a rotating open end reactor. The findings of the present applicant are particularly surprising in view of a teaching of the art that products heretofore obtained by somewhat similar operations contain residual water. The products of the present invention do not require further treatment to remove residual water since they are obtained in dry, granular form.

It is an object of this invention to prepare solid, granular fertilizer by the reaction of only liquid reactants. It is another object of the invention to obtain a dry, free-flowing granular fertilizer.

Other aspects, objects and the several advantages of the invention are apparent from a study of this disclosure, the drawing and the claims.

According to the present invention, there is provided a method for the continuous production of a high nitrogen content, dry, granular fertilizer from only liquid reactants which comprises bringing together a solution of ammonium nitrate, ammonia and water with liquid phosphoric and sulfuric acids in an agitated reaction zone in which these reactants are present, in amounts to provide upon reaction a product containing approximately 26–27 weight percent nitrogen and 14 percent phosphorus, as $P_2O_5$, in the presence of a solid, sub-divided fertilizer having approximately the same composition and in amount sufficient to obtain continuously from said zone a dry, granular product while maintaining said zone at a temperature in the range of about 195° to 230° F. and whenever the product being discharged from said zone is not a dry, granular product of a desired size distribution, recycling product to said zone in a weight ratio of product to reactants fed to said zone of at least about 2:1 and whenever said last ratio is less than 3:1, maintaining the weight ratio of recycled product to the acids greater than about 4.5:1.

The very high nitrogen content of the fertilizers of this invention is difficult to obtain, and necessitates the use of various nitrogen solutions which are available in industry. These nitrogen solutions comprise solutions of ammonium nitrate and anhydrous ammonia in water. The other two liquid reactants which are used in the invention are concentrated phosphoric acid, containing from 45 to 85 percent by weight $P_2O_5$, and concentrated sulfuric acid, of concentration greater than 90 percent by weight.

It is particularly surprising that a granular fertilizer can be prepared by reacting these liquid reactants in equipment normally used for reacting one or more liquid reactants with at least one, and usually more, solid reactants. The method of the present invention is particularly advantageous in view of this, since commercial fertilizer manufacturers can thus utilize their present ammoniating equipment and yet they are able to realize the advantages of handling liquid reactants. It is well known, of course, that the storage, transportation and handling of liquid materials is simpler and more economical than handling bulk solids.

The nitrogen solutions which are useful in the practice of this invention include many different formulations of ammonium nitrate, anhydrous ammonia and water. Some examples of suitable nitrogen solutions are those sold under the trademark "Phillips 66 Nitrogen Solutions" and have the following compositions:

*Phillips 66 nitrogen solutions*

| Composition | Figures in Weight Percent | | | | | | | | |
|---|---|---|---|---|---|---|---|---|---|
| | #1 | #2 | #3 | #4 | #5 | #6 | #7 | #8 | #9 |
| Total Nitrogen | 41.0 | 41.0 | 37.0 | 45.2 | 47.1 | 41.4 | 44.0 | 44.0 | 49.0 |
| Nitrate Nitrogen | 11.5 | 9.8 | 11.6 | 11.9 | 11.2 | 12.9 | 10.5 | 12.2 | 10.5 |
| Ammonia Nitrogen | 29.5 | 31.2 | 25.3 | 33.3 | 35.9 | 28.5 | 33.5 | 31.8 | 38.5 |
| Ammonium Nitrate | 65.7 | 55.9 | 66.8 | 68.0 | 64.0 | 74.0 | 60.0 | 69.8 | 60.0 |
| Anhydrous Ammonia | 21.9 | 26.1 | 16.6 | 26.0 | 30.0 | 19.0 | 28.0 | 23.8 | 34.0 |
| Water | 12.4 | 18.0 | 16.6 | 6.0 | 6.0 | 7.0 | 12.0 | 6.4 | 6.0 |

As will be shown, it is essential, according to the invention, to maintain a bed of solid product within the reactor to which the liquid reactants are being fed. Usually, the invention will be operated with recycle of solid product and this form of the invention is now considerably preferred. The amount of solid or recycle is also critical as insufficient solid will cause the product to be non-granular. The recycle ratio, when expressed on a weight basis, is preferably above a ratio of 3 units of weight of recycle product for each unit of weight of total reactants being fed to the reactor. However, recycle ratios down to about 2:1 on the same basis can be employed in certain instances. When the recycle ratio becomes less than 3:1, it is necessary that the weight ratio of recycle solids: total weight of phosphoric acid and sulfuric acid be greater than 4.5:1. This excludes the nitrogen solution.

It is within the scope of this invention to use a retaining ring within the reactor to maintain proper bed depth of solids. If the product discharging from the end of the reactor is all within the desired size range, recycle is not required. Such a condition can sometimes be reached if bed depth is sufficient, but such a condition is rarely encountered.

The reactor wherein the liquid reactants are contacted together under a bed of solid recycle material is operated at a temperature between about 195 and about 230° F. to obtain the desired granulation. All of the heat in the reactor is supplied by the heat of reaction between the nitrogen solution and the phosphoric and sulfuric acids, so the flow rates of the liquids must be maintained in their proper ratio, and have to be maintained within rather critical limits on total flow. One method for maintaining the proper temperature within the reactor is to utilize a temperature controller with a 195 to 230° F. set band with this controller controlling a diaphragm motor valve in the nitrogen solution feed line. An orifice and a flow controller in the nitrogen feed line controls the ratio of the acid flows to the nitrogen flow.

The desired granular product from this process contains 26 to 27 weight percent nitrogen and 14 percent phosphorus as $P_2O_5$. This granular product has a mesh size of from 6 to 20 mesh. The solids which are recycled to the reactor have a size less than 8 mesh. Thus, as the granular product discharges from the reactor, it passes immediately through a series of screens, and the desired amount of less than 8 mesh product is withdrawn from the proper screen tables and recycled by means of a conveyor belt to the reactor.

EXAMPLE I

An embodiment of the present invention is now described with reference to the attached drawing. Two hundred pounds of 93 percent by weight sulfuric acid is withdrawn from storage thru line 1 and is charged into reactor 3. Simultaneously, 258 pounds of 54 percent by weight phosphoric acid is withdrawn from storage and passed via line 5 into line 1. This admixes the acids prior to entry into the reactor. At the same time, 650 pounds Phillips #5 nitrogen solution, containing 64 weight percent ammonium nitrate, 30.0 weight percent anhydrous ammonia, and 6.0 weight percent water, is withdrawn from storage and passed via line 7 into the reactor. These liquids enter the reactor through distributing tubes located at the bottom of the reactor under a bed of solid product. Solid product discharges from the end of the reactor through line 9, and passes through screens for size classification. Recycle solids of a size less than 8 mesh are returned to the reactor by way of 11 which is a suitable type of conveyor for solid material, here a conveyor belt. The amount of recycle on a weight basis is three times the weight of the acids and nitrogen solution being charged to the reactor. The temperature in the reactor is controlled by a temperature controller (TRC) which actuates a motor valve in the nitrogen feed line. Ratio flow controllers, attached to orifices in the reactant feed lines, maintain the flow of the acids in proper proportion to the nitrogen solution feed rate. By operating in this manner, a —6+20 mesh 27–14–0 product containing 1 percent by weight water is obtained. The product is a dry, granular product which is not subject to excessive caking on storage.

The following specific examples illustrate processes according to the present invention.

EXAMPLE II

A series of runs were made in a batch reactor in which a high-analysis granular fertilizer containing no potash was prepared from liquid reactants.

In these runs, a one-gallon glass jar was clamped into place such that a motor and gear box rotated the jar at 78 r.p.m. Two spargers (distributors), located in the bottom of the jar, were connected by pipes passing through the open end of the jar to two feed tanks. A thermocouple was also located in the bottom of the jar so that temperature could be measured.

Nitrogen solution was charged to one of the feed tanks, while the other feed tank was charged with a mixture of the desired amounts of phosphoric acid and sulfuric acid. The liquid reactants were then charged to the rotating jar in the desired ratio thus forming solid reaction products.

In the first run, the reactants were fed to a 3-liter glass flask so that solid product could be obtained for use as recycle in subsequent runs. All other runs were made as described above. The product from the run made in the 3-liter flask was mechanically crushed to approximately 8 mesh before being used as recycle in the other runs.

In all of these runs, the reactants were added over a period of 60–90 seconds, after which the feed streams were shut off, and the reactor was rotated for an additional two minutes. The reactor was then shut off, and the solid product was dumped from the reactor.

The results of these runs are expressed below as Table I.

Table I

| Run No. | Fertilizer Prepared | Phillips [1] Nitrogen Solution Used | Grams Nitrogen Used | Grams H$_3$PO$_4$ | Grams H$_2$SO$_4$ | Grams Recycle Solids | Weight Ratio Recycle to Feed | Weight Ratio Recycle to Acids |
|---|---|---|---|---|---|---|---|---|
| 1 | 27-14-0 | #6 | 653 | 260 | 201 | ---- | ---- | 7.26:1 |
| 2 | 27-14-0 | #6 | 163 | 65 | 50 | 836 | 3:1 | 5.36:1 |
| 3 | 26-14-0 | #5 | 138 | 63 | 77 | 750 | 3:1 | 5.0:1 |
| 4 | 26-14-0 | #9 | 132 | 62 | 88 | 750 | 3:1 | 4.8:1 |
| 5 | 27-14-0 | [2] #4 & #6 | 204 | 85 | 61 | 700 | 2:1 | 2.42:1 |
| 6 | 27-14-0 | #6 | 327 | 130 | 100 | 557 | 1:1 | 4.05:1 |
| 7 | 27-14-0 | #6 | 245 | 97 | 75 | 697 | 1.67:1 | 8.7:1 |
| 8 | 27-14-0 | #3 | 146 | 52 | 40 | 800 | 4:1 | 3.7:1 |
| 9 | 26-14-0 | #5 | 185 | 87 | 102 | 700 | 2:1 | |

| Run No. | Maximum Temperature During Run, °F. | Screen Analysis Wt. Percent | | | | | | | |
|---|---|---|---|---|---|---|---|---|---|
| | | +4 | −4 +6 | −6 +8 | −8 +12 | −12 +20 | −20 +40 | −40 | On size −6 +20 |
| 1 | 158 | (3) | (3) | (3) | (3) | (3) | (3) | (3) | (3) |
| 2 | 198 | 6.7 | 6.2 | 13.7 | 31.0 | 28.1 | 10.5 | 3.8 | 72.8 |
| 3 | 216 | 31.1 | 17.1 | 21.1 | 18.3 | 11.1 | 1.1 | 0.2 | 50.5 |
| 4 | 226 | 29.1 | 17.9 | 26.6 | 17.3 | 8.3 | 0.6 | 0.2 | 52.2 |
| 5 | 199+ | 26.4 | 21.8 | 24.7 | 15.8 | 9.8 | 1.4 | 0.1 | 50.3 |
| 6 | 257 | (4) | (4) | (4) | (4) | (4) | (4) | (4) | (4) |
| 7 | 212 | (4) | (4) | (4) | (4) | (4) | (4) | (4) | (4) |
| 8 | 167 | 23.7 | 10.7 | 12.1 | 14.7 | 22.6 | 11.7 | 4.5 | 49.4 |
| 9 | 234 | 59.5 | 5.9 | 17.4 | 8.3 | 7.3 | 1.2 | 0.4 | 33.0 |

[1] Table of Phillips nitrogen given in body of disclosure.
[2] 5.5 weight percent #4 solution and 95.5 weight percent #6 solution.
[3] Product crushed for recycle.
[4] Balled up.

In Table I, runs 2, 3, 4 and 5 were carried out according to the present process. In run 5, the product contained more moisture than in runs 2, 3, and 4 but the product did not contain sufficient moisture as to cause caking during storage. In runs 6 and 7, large spheroids were obtained which were much larger than the desired product particle size. The poor product from these runs was due to the very low recycle ratio. While the product from run 8 contained a large percentage of 6-20 mesh particles, this material contained too much moisture, considerably more than that necessary to cause caking during storage. This high moisture content was due to the low temperature employed in the reactor. The product from run 9 also contained some 6-20 mesh particles, but a considerable amount of this material was larger than 4 mesh. The presence of this excess of large particles was due to the high temperature in the reactor, this temperature causing actual melting of some of the fertilizer. The molten fertilizer caused solid particles to stick together, thus producing oversize product.

In the operation of the present invention, the product emerges substantially dry, yet there is experienced no loss of ammonia as is experienced in the prior art.

It should be especially noted that the ratios expressed herein and in the claims are critical in the exact patent sense of the word since product which requires drying prior to storage to avoid caking upon storage is, of course, not desired.

Reasonable variation and modification are possible within the scope of the foregoing disclosure, the drawing, and the appended claims to the invention, the essence of which is that there has been provided a process for the preparation of a dry granular free-flowing fertilizer product containing approximately 26-27 weight percent nitrogen and 14 percent phosphorus, as P$_2$O$_5$, using only liquid reactants by bringing these together in an agitated, preferably rotating reaction zone, when the zone is rotating, no additional agitation being necessarily required, proper amounts of a nitrogne-containing solution composed of ammonia, ammonium nitrate and water and phosphoric and sulfuric acids while having in the reaction zone, solid sub-divided fertilizer product having a composition which is substantially that of the product of the invention in an amount sufficient to provide discharge of a desired product size distribution while maintaining the reaction zone at a temperature in the approximate range of 195–230° F. and whenever the product being discharged from the reaction zone is in a dry, free-flowing product, adjusting the ratio of solid granular product maintained in said zone to liquid reactants fed to said reaction zone, on a weight basis, to a value of at least about 2:1 and whenever the said ratio is less than about 3:1, maintaining a ratio by weight of said solid granular product to total weight of the acid reactants used above about 4.5:1.

I claim:

1. A process for the continuous production of a dry, granular fertilizer containing approximately 26-27 weight percent nitrogen and 14 percent phosphorus, as P$_2$O$_5$, using only liquid reactants which comprises bringing together in an agitated reaction zone proper amounts of a nitrogen-containing solution in the form of a solution of ammonium nitrate and anhydrous ammonia in water and concentrated sulfuric acid at least about 90 percent by weight and concentrated phosphorus acid having at least 45 percent by weight P$_2$O$_5$ in the presence of pre-formed solid sub-divided fertilizer product having substantially the aforesaid composition, maintaining the reaction zone at a temperature in the approximate range of 195–230° F., maintaining a sufficient body of solid product in the reaction zone to ensure discharge of dry, solid granular product therefrom, separating from granular product thus obtained a desired first portion of on-size product consisting essentially of dry, granular fertilizer containing approximately 26-27 weight percent nitrogen and 14 percent phosphorus, as P$_2$O$_5$, and a second portion of product composed of material having a size not appreciably larger than on-size product and containing a substantial portion of smaller than on-size material, recycling said second portion of solid granular product to said zone, adjusting the ratio of the recycled product to liquid reactants fed to said reaction zone, on a weight basis, to a value of at least about 2:1 and whenever the said ratio is less than about 3:1 yet not less than about 2:1, maintaining a ratio by weight of said recycled product to total weight of the acids above about 4:5:1.

2. A process according to claim 1 wherein the agitated reaction zone consists essentially of a rotating open end zone.

3. A process according to claim 2 wherein the zone is so operated as to maintain therein a bed of solid sub-divided product.

4. A process for the continuous production of a dry, granular fertilizer containing approximately 26-27 weight percent nitrogen and 14 percent phosphorus, as $P_2O_5$, using only liquid reactants which comprises bringing together in an agitated reaction zone proper amounts of a nitrogen-containing solution in the form of a solution of ammonium nitrate and anhydrous ammonia in water and concentrated sulfuric acid at least about 90 percent by weight and concentrated phosphoric acid having at least 45 percent by weight $P_2O_5$ in the presence of pre-formed solid sub-divided fertilizer product having substantially the aforesaid composition, maintaining the reaction zone at a temperature in the approximate range of 195-230° F., maintaining a sufficient body of solid product in the reaction zone to ensure discharge of dry, solid granular product therefrom, separating from granular product thus obtained a desired first portion of on-size product consisting essentially of dry, granular fertilizer containing approximately 26-27 weight percent nitrogen and 14 percent phosphorus, as $P_2O_5$, and a second portion of product composed of material having a size not appreciably larger than on-size product and containing a substantial portion of smaller than on-size material, recycling said second portion of solid granular product to said zone, adjusting the ratio of the recycled product to liquid reactants fed to said reaction zone, on a weight basis, to a value of at least about 3:1.

5. A process for the continuous production of a granular fertilizer containing approximately 26-27 weight percent nitrogen and 14 percent phosphorus, as $P_2O_5$, using only liquid reactants, which comprises bringing together in an agitated reaction zone, proper amounts of a nitrogen-containing solution, in the form of a solution of ammonium nitrate and anhydrous ammonia in approximately 6-12 weight percent of water based on the solution, and concentrated sulfuric acid having a concentration greater than 90 percent and concentrated phosphoric acid having at least 45 percent by weight $P_2O_5$ in the presence of solid, sub-divided fertilizer product having substantially the aforesaid composition, maintaining the reaction zone at a temperature in the approximate range of 195-230° F., maintaining a sufficient body of earlier formed solid product in the reaction zone to ensure discharge of solid granular product therefrom, separating from granular product thus obtained a desired first portion of on-size product consisting essentially of dry, granular fertilizer containing approximately 26-27 weight percent nitrogen and 14 percent phosphorus, as $P_2O_5$, and a second portion of product composed of material having a size not appreciably larger than on-size product and containing a substantial portion of smaller than on-size material, adjusting the ratio of solid granular product to liquid reactants fed to said reaction zone, on a weight basis, to a value of at least about 2:1 and whenever the said ratio is less than about 3:1 yet not less than about 2:1, maintaining a ratio by weight of said solid product to total weight of the acids above about 4:5:1.

References Cited in the file of this patent
UNITED STATES PATENTS

| | | |
|---|---|---|
| 1,930,883 | Oehme et al. | Oct. 17, 1933 |
| 2,680,680 | Coleman | June 8, 1954 |
| 2,857,262 | Graham | Oct. 21, 1958 |